(12) United States Patent
Brække

(10) Patent No.: US 8,950,478 B2
(45) Date of Patent: Feb. 10, 2015

(54) COUPLING BETWEEN WELLBORE TOOLS HAVING CENTRAL TRANSMISSION SHAFTS

(75) Inventor: Kristoffer Brække, Stavanger (NO)

(73) Assignee: I-Tec AS, Royneberg (NO)

( * ) Notice: Subject to any disclaimer, the term of this patent is extended or adjusted under 35 U.S.C. 154(b) by 1074 days.

(21) Appl. No.: 12/922,997

(22) PCT Filed: Mar. 19, 2009

(86) PCT No.: PCT/NO2009/000103
§ 371 (c)(1),
(2), (4) Date: Nov. 1, 2010

(87) PCT Pub. No.: WO2009/116874
PCT Pub. Date: Sep. 24, 2009

(65) Prior Publication Data
US 2011/0036563 A1 Feb. 17, 2011

(30) Foreign Application Priority Data

Mar. 19, 2008 (NO) .................................. 20081419
Feb. 27, 2009 (NO) .................................. 20090916

(51) Int. Cl.
E21B 23/00 (2006.01)
F16D 1/108 (2006.01)
E21B 17/046 (2006.01)
F16D 1/10 (2006.01)

(52) U.S. Cl.
CPC ............... E21B 17/046 (2013.01); E21B 23/00 (2013.01); F16D 1/108 (2013.01); F16D 2001/103 (2013.01)
USPC ......................... 166/242.6; 166/170; 403/355

(58) Field of Classification Search
USPC ............... 166/242.6, 170, 243; 175/101, 104; 403/355, 356, 357, 358
See application file for complete search history.

(56) References Cited

U.S. PATENT DOCUMENTS 3,499,485 A 3/1970 Phillips
3,646,996 A 3/1972 Pearce, Jr.
(Continued)

FOREIGN PATENT DOCUMENTS

CA 2 613 232 7/2006
GB 2 398 814 7/2005
(Continued)

OTHER PUBLICATIONS

International Search Report issued Jun. 16, 2009 in International (PCT) Application No. PCT/N02009/000103.

Primary Examiner — Robert E Fuller
(74) Attorney, Agent, or Firm — Wenderoth, Lind & Ponack, L.L.P.

(57) ABSTRACT

Two well tools (100, 200) having centrally mounted drive shafts (160, 260) are provided with a mechanism to remove debris from a coupling between them. Thereafter, the tools can be coupled by inserting a first outer sleeve (110) on the first tool into and rotationally lock it to a second outer sleeve (210) on the second tool. The drive shafts (160, 260) are coupled in a similar manner. The mechanism for removing debris can displace the debris and/or a flushing device (170) using well fluid to stir up debris. The coupling has space for debris that is not removed, e.g. in the form of a chamber 264. The female part of the coupling may comprise a spring loaded lid (271) to reduce pollution by debris when the coupling is not in use.

12 Claims, 2 Drawing Sheets

(56) References Cited

U.S. PATENT DOCUMENTS

| | | | |
|---|---|---|---|
| 5,957,209 A | 9/1999 | Burleson et al. | |
| 5,984,006 A * | 11/1999 | Read et al. | 166/63 |
| 6,059,030 A | 5/2000 | Celestine | |
| 6,345,669 B1 | 2/2002 | Buyers et al. | |
| 6,453,996 B1 | 9/2002 | Carmichael et al. | |
| 6,978,841 B2 | 12/2005 | Hoffman et al. | |
| 7,048,514 B2 | 5/2006 | Khomynets | |
| 2001/0042643 A1 | 11/2001 | Krueger et al. | |
| 2002/0179305 A1 | 12/2002 | Mack et al. | |
| 2005/0272507 A1 | 12/2005 | Wenzel et al. | |
| 2005/0274527 A1 | 12/2005 | Misselbrook et al. | |
| 2009/0236100 A1 | 9/2009 | Lawson | |

FOREIGN PATENT DOCUMENTS

| | | |
|---|---|---|
| NO | 316774 | 5/2004 |
| NO | 317538 | 11/2004 |
| NO | 324579 | 11/2007 |
| WO | 95/21987 | 8/1995 |
| WO | 2004/094735 | 11/2004 |

* cited by examiner

COUPLING BETWEEN WELLBORE TOOLS HAVING CENTRAL TRANSMISSION SHAFTS

BACKGROUND

The invention regards a coupling between wellbore tools having central drive shafts.

PRIOR AND RELATED ART

In recovery of oil and gas, a borehole is drilled through subterranean formations. Parts of the borehole are completed with steel pipes that are cemented to the formation. These steel pipes are known in the industry as 'casing' and 'liners' depending on diameter and location in the well. In this description and in the enclosed claims both types are collectively denoted 'casing'. Production pipes can be inserted into the borehole through the casing, and equipment can be run down inside casing or production pipes. In the following, 'pipes' comprises casing, liners and production pipes, and are collectively called 'tubulars' in the industry. Equipment run into the wellbore is collectively known as 'wellbore tools'. Hence, in this disclosure 'wellbore tools' comprise running tools, plugs, loggers, valves and other equipment with or without a motor.

High energy prices make deeper wells commercially viable. Present wells can be several kilometers deep, and may comprise horizontal branches that also can be several thousand meters long. The temperature in a modern well may approach 200° C. Since formation pressure is caused by the weight of rock and water, deeper wells results in correspondingly higher pressures at the bottom of the hole.

Previously, drilling mud with high densities was used to control pressure from the formations in practically all boreholes. In many present wells so called underbalanced drilling, where the pressure in the borehole is less than in the ambient formations, is used. Underbalanced drilling increases the amount of available hydro carbons, but also the risk for sudden pressure changes in the borehole due to a high pressure region or a gas reservoir in the formation.

The fluid flowing from the subterranean formations is a mixture of gas, oil components, water and solid particles like sand etc. In addition, the fluid can contain material from dressing or milling of pipes, cuttings, and/or other solid particles of various sizes. The solids are in the following collectively called 'debris'.

There is sometimes a need to place a well tool in a wellbore. This may be done by running a running tool (well tractor) coupled to the well tool into the wellbore. When the well tool is placed, the running tool may activate slips on the well tool, be decoupled and return to the surface. When the tool is to be retrieved at a later time, the running tool may be sent back into the wellbore to retrieve it. The running tool may also be used to operate tools in the well, for example to open or close a valve.

A first example of a well tool can be a well plug preventing fluid flow in a pipe. Well plugs are used e.g. in the period between casing and production for pressure testing and inspection, or when the fluid flow from a branch or a well no longer contains a sufficient concentration of hydrocarbons. Such plugs are often positioned by a running tool which is returned to the surface when the task is done. If the plug is to be removed at a later time, the running tool is sent back to perform the task.

Norwegian patent application NO 2008 1406 (Petro Tolls AS) describes such a well tool that may serve as an example. This plug has a through channel extending along its entire axis of rotation. A ball valve is located in the central channel and can be opened and closed when the driveshaft is rotated within a neutral sector. When the drive shaft is rotated beyond the neutral sector, it rotates a lead screw which moves seals and slips radially. Outside the neutral sector, the ball valve is kept open independent of the direction of rotation. Thereby free passage through the central channel of the plug in the critical phases wherein the seals seal against the pipe wall while the slips do not provide sufficient retaining force. This prevents a plug from being blown with great force through the pipe by a sudden change in pressure. This plug can be set or retrieved by a running tool.

From this example, it is clear that the running tool must be capable of providing a relative rotation between the outer housing of the plug and an inner drive shaft in both directions. It is also clear that the central driving shaft of the running tool in some instances should be hollow, so that the running tool does not pull the plug along during a sudden change in pressure as described above.

A second example is sleeve valves wherein a relative rotation between two sleeves having a common axis of rotation opens or closes radial side ports. Such valves can be operated by means of a running tool capable of providing a relative rotation between the inner and outer sleeves of the valve in both directions.

A third example is modules for well logging which are retained in the well by slips for a shorter or longer period of time. These may also be set or retrieved by a running tool. In some applications, it may be necessary or advantageous to couple such logging tools in series. A running tool may then be sent into the wellbore with another well tool mounted on it, and the mounted well tool can be coupled to a well tool already disposed in the well. In some instances, it may be advantageous to provide more than two concentric sleeves to affect different elements in such a string of tools, or to be able to control one or more tools in the series individually.

As well tools for natural reasons tend to be substantially cylindrical, it may be advantageous to provide mechanical operations related to coupling, decoupling, setting, operation and retrieval of them by relative rotation between rotationally symmetric elements. These rotationally symmetric elements can be solid or hollow shafts, sleeves, collets etc. As evident from the third example above, in some applications it may be necessary or advantageous to provide more than two concentric sleeves in a well tool, whether the well tool is a running tool with a motor, or valves and modules without a motor.

There is hence a need for a robust coupling between two well tools enabling a simple connection between them, also in a well bore. The coupling has to be secure and reliable, and must be able to provide a relative rotation between two rotationally symmetric elements in both directions.

When a well tool has been placed in a wellbore for some time, the coupling of the tool will frequently be covered by collected debris. Such collected debris makes it difficult to connect a running tool or other well tools.

It is known to use equipment such as compressors on the surface and long conduits from the surface to wash away debris from a coupling element. This may involve relatively long down times, and may be problematic to perform in e.g. deep wells having long side branches.

The objective of the invention is hence to provide a robust coupling between two well tools enabling a relative rotation between an outer sleeve and a driveshaft rotatably mounted in the sleeve. A robust coupling must be able to cope with debris in the well fluids before or around the time of coupling.

SUMMARY OF THE INVENTION

The invention provides a coupling for wellbore applications between a first tool comprising a first drive shaft rotatably mounted in a first outer sleeve and a second tool comprising a second drive shaft rotatably mounted in a second outer sleeve, distinguished in that the outer diameters of the first outer sleeve are less than or equal to corresponding inner diameters of the second outer sleeve and wherein one of the outer sleeves comprises at least one first latching dog fitting into at least one first groove in the second outer sleeve, that the outer diameters of the first drive shaft are less than or equal to corresponding inner diameters of the second drive shaft, and wherein one of the drive shafts comprises at least one second latching dog fitting into at least one second groove in the other drive shaft, and that at least one of the tools comprises means for removing debris.

When at least one of the tools comprises means for removing debris, most of the debris can be removed from the latching dogs and grooves prior to connecting them.

When the first outer sleeve can be inserted into the second outer sleeve, and relative rotation between them prevented by the first latching dog and groove, and the first drive shaft can be inserted into the second drive shaft, and relative rotation between them prevented by the second latching dog and groove, a coupled driveshaft rotatably mounted in a coupled outer sleeve is achieved. The coupled outer sleeve prevents debris from entering the region of latching dogs and grooves.

An optional flushing mechanism can use well fluid to stir up debris before coupling. By using well fluid for the flushing, complicated surface operations and transport of flushing fluid from the surface to the well tool is avoided.

A lid mechanism over the opening of the second sleeve can limit the amount of debris that can be deposited on the coupling element, and provides a relatively smooth surface without deep grooves or corners that may be difficult to flush clean.

There is provided space for remaining debris that is likely to enter the coupling. Thereby, the coupling will work even if it is not completely free of debris.

BRIEF DESCRIPTION OF THE DRAWINGS

The invention is described in greater detail in the following with reference to the accompanying drawings, in which like numerals refer to like parts, and in which.

DETAILED DESCRIPTION

Figure 1:
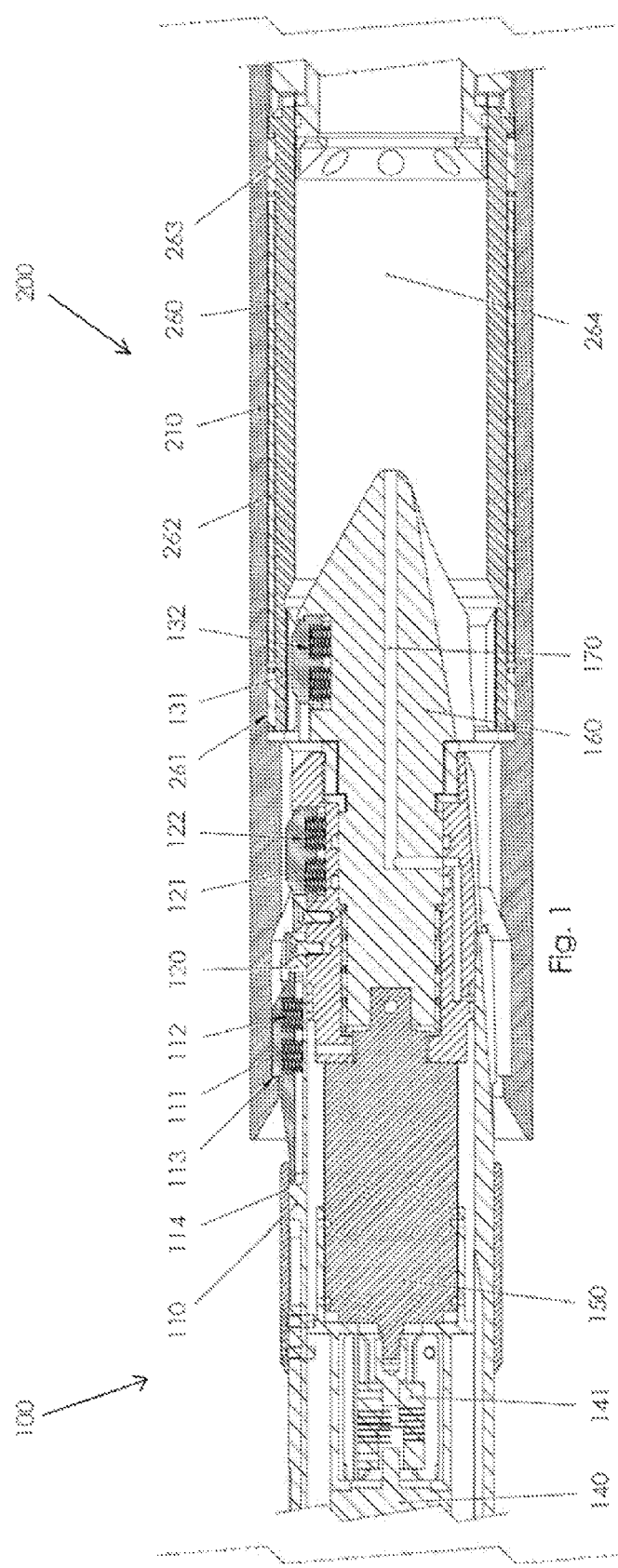
FIG. 1 shows a coupling in which two coupled drive shafts are rotatably mounted in a coupled and closed outer housing.

FIG. 1 shows a coupling according to the invention.

In this embodiment, the first tool is a running tool 100 having a motor 140 and drive shaft 160 rotatably mounted in a housing 110. The second tool, in the following denoted "the well tool", is unspecified apart from that it has a central drive shaft 260 rotatably mounted in an outer sleeve or housing 210.

The running tool is collectively referred to by numeral 100, and parts belonging to this have reference numerals in the range 101-199.

The well tool is similarly collectively referred to by numeral 200, and parts belonging to this, including the female parts of the coupling, have reference numerals in the range 201-299.

In the following, 'backward' refer to the direction to the left and 'forward' to the right in the FIGS. 1 and 2.

The running tool 100 is substantially rotational symmetric. The main parts are a housing 110, a motor 140, a gear assembly 150 and a drive shaft 160. The drive shaft 160 may be rotated relative to the housing 110.

As noted above, deposited debris can prevent coupling between a running tool and a well tool. The well tool advantageously has a surface making it relatively easy to remove this debris. Furthermore, the drive shaft of the running tool may comprise means for removing debris. Such mechanical means are further described below with reference to FIGS. 3a and 3b. These may be used alone or in combination with flushing in order to remove the debris from the coupling.

In both cases, a male part having a first outer sleeve (housing) 110 and a first drive shaft 160 is inserted into a female part having a second outer sleeve 210 and a second drive shaft 260. When the outer sleeve (or housing) 110 of the male part is inserted into the outer sleeve 210 of the female part, the outer sleeves may be rotated relative to each other until first latching means on the male part engages corresponding first latching means (latching member) on the female part. These first latching means (latching member), which prevent rotation between the outer sleeves, are in FIG. 1 illustrated by radially biased latching dogs 121 on the outer surface of the male part capable of snapping into corresponding longitudinal splines or groves on the inner surface of the female part.

For flushing, the running tool may further comprise an inlet for well fluid in the outer wall of the running tool, via a pump to a conduit 170 in the head of the drive shaft 160, and on through one or more outlets in the head of the drive shaft, as illustrated in FIG. 1. In order to transport well fluid between the housing 110 and the rotating drive shaft 160, a conventional swivel joint is used, which by itself is not part of the invention. Inlet(s) and pump are not shown. The well fluid may be discharged with sufficient pressure to stir up the debris, to facilitate its transport backwards and away from the coupling.

Figure 3B:
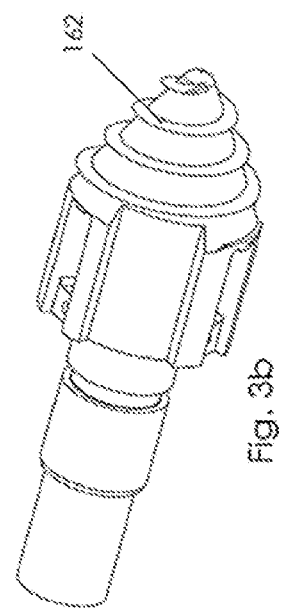
FIGS. 3a-b show two embodiments of means for mechanical displacement of debris.
Figure 3A:
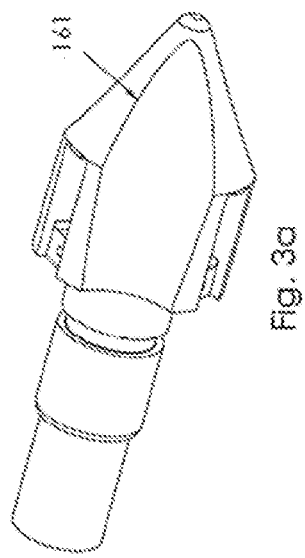

After mechanical removal and flushing, most of the debris will be removed from the coupling. When connecting, the male part 100 will displace well fluid from the female part 200. Hence, the coupling needs conduits so that displaced fluids may escape. In FIGS. 3a and 3b this is illustrated by depressions in the head of the male part. During connection, residual debris will be let into the coupling. A chamber 264 is provided in the female part to accommodate such residual debris.

In the embodiment shown in FIG. 1, the male part of the coupling is provided on the running tool, while the female part of the coupling is provided on the well tool, which may be a plug, a valve, a logging tool or some other tool disposed in the well for a period of time. It is possible to provide the female part on a running tool and the male part on a well tool.

In both cases, a male part having a first outer sleeve 110 and a first drive shaft 160 is inserted into a female part having a second outer sleeve 210 and a second drive shaft 260. When the outer sleeve 110 of the male part is inserted into the outer sleeve 210 of the female part, the outer sleeves may be rotated relative to each other until first latching means on the male part engages corresponding first latching means on the female part. These first latching means, which prevent rotation between the outer sleeves, are in FIG. 1 illustrated by radially biased latching dogs 121 on the outer surface of the male part capable of snapping into corresponding longitudinal splines or groves on the inner surface of the female part.

Similar second latching means (latching members), illustrated by latching dogs 131 in FIG. 1, can prevent rotation between the drive shafts 160 and 260. When the driveshaft 160 of the running tool first is inserted into the drive shaft 260 of the female part, the latching dogs 131 are unlikely to enter their respective splines or grooves directly. As described in connection with coupling of the outer sleeves, a relative rotation between the driveshaft 160 of the male part and the drive shaft 260 of the female part bring the second latching means into engagement. In the embodiment of FIG. 1, radially preloaded latching dogs 131 on the drive shaft 160 of the male part snap out and into splines on the drive shaft 260 of the female part.

It should be understood that one or both of the discussed latching mechanisms can be designed differently from those shown in FIG. 1, e.g. in that longitudinally extending shoulders are brought into engagement with each other by other means.

FIG. 1 also shows a latch 111 retained at its first proximal end on the outer surface of the male part. It is understood that several similar latches may be disposed around the circumference of the male part. The distal end of the latch 111 has a sliding surface which is inclined axially outward toward the proximal end of the latch, and is preloaded radially outward by one or more springs 112. When the male part is inserted into the female part, the sliding surface will compress the spring 112. Once an outer shoulder 113 on the latch 111 passes a corresponding inner shoulder along the inner circumference of the female part, the distal end of the latch is pushed radially outward by the spring 112. The outer shoulder 113 of the latch will then abut the corresponding inner shoulder in the female part and prevent the male part from being pulled out of the female part.

A releasing sleeve 114 can be moved axially relative to the latch 111, e.g. by means of a linear actuator and a rod. When the sleeve 114 is moved axially toward the distal end of the latch 111, the latch 111 is forced inward until the shoulder 113 no longer retains it in the female part. The male part can then be pulled out of the female part.

At least one latching dog 121 is disposed rotationally locked relative to the outer housing 110 of the running tool, and is forced radially outward by one or more springs 122. In FIG. 1, the latching dog 121 is engaging a corresponding longitudinal spline 221 (see FIG. 2) which is disposed rotation locked relative to the outer housing 210 of the well tool. This prevents relative movement between the outer housing 110 of the running tool and the outer housing 210 of the well tool. Alternatively, the latching dog 121 might have been disposed on an inner surface of the well tool and the spline or groove on an outer surface of the running tool.

Similarly, at least one latching dog 131 is disposed rotation locked relative to the drive shaft 160 of the male part, and is forced radially outward by one or more springs 132. In FIG. 1, the latching dog 131 is engaging a corresponding longitudinal spline 231 (see FIG. 2) which is disposed rotationally locked relative to the drive shaft 260 of the well tool. This prevents relative movement between the drive shaft 160 of the running tool and the drive shaft 260 of the well tool. Alternatively, the latching dog 131 might have been disposed on the well tool and the spline or groove on the running tool.

The drive shaft 260 of the well tool is rotatably mounted in the outer housing 210 of the well tool by bearings 261 and 263. These are kept axially apart by a spacer 262.

When the motor 140 of the running tool is activated, torque is transferred through a flexible coupling 141 and a gear assembly 150 to the drive shaft 160 and further to the drive shaft 260 of the well tool. The drive shafts 160, 260 will thereby rotate relative to the outer housings 110, 210. This rotational movement can be used to clamp or release the slips of the well tool, open or close a valve in the well tool, et cetera.

Figure 2:
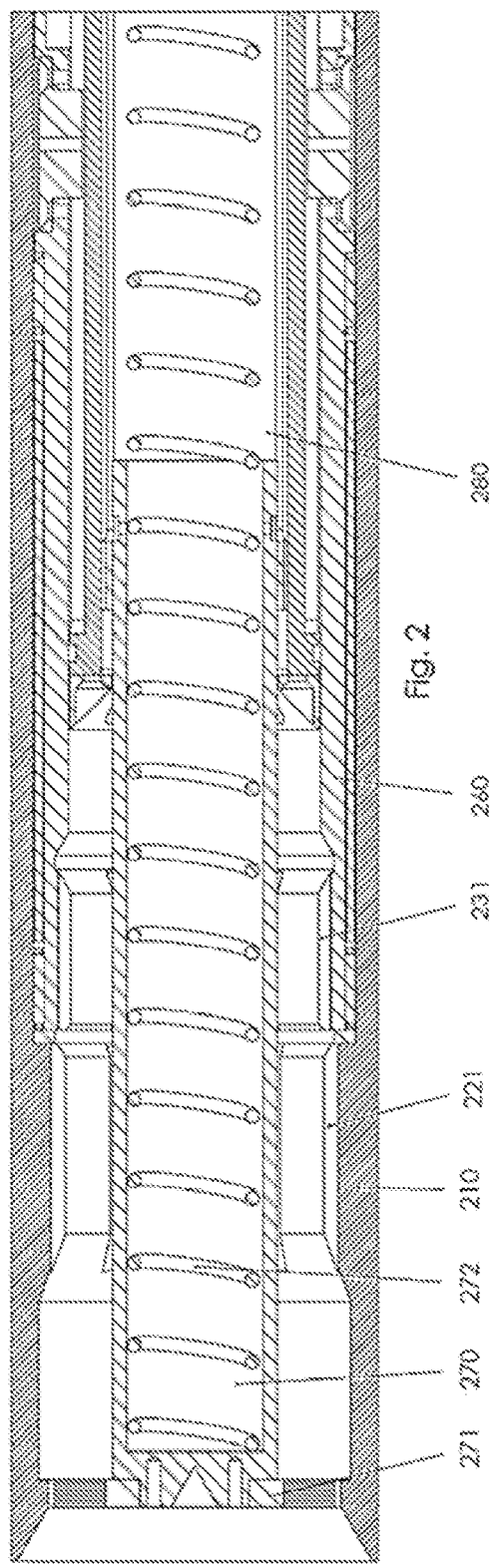
FIG. 2 shows a lid that may prevent debris from entering the region of coupling elements according to the invention.

FIG. 2 shows an alternative embodiment of the female part. Outer sleeve 210 and drive shaft 260 are as in FIG. 1. The figure also shows the longitudinal splines 221 and 231 corresponding to the latching dogs 121 and 131 respectively, as previously discussed in connection with FIG. 1.

The embodiment in FIG. 2 further comprises a piston 270 axially slidably mounted in an outer piston sleeve 280. The piston 270 and the outer piston sleeve 280 thereby form a telescopic coupling. A spring 272 preloads piston 270 and outer piston sleeve 280 such that the telescopic coupling is in its maximum extended state when it is not exposed to external forces. A flexible scraper 271 is mounted on the piston 270 and functions as a lid at the outer end of the female part when the coupling is not in use. The preloaded telescopic coupling has no other functions.

The flexible scraper 271 can be implemented as a brush having radially extending bristles, as an annular rubber edge, or similar.

When most of the debris is removed from the lid by means of mechanical means and flushing, the male part will be inserted into the female part and push the piston 270 against the spring force from the spring 272 (toward the right in FIG. 2). This will displace fluid from the inside of the telescopic coupling to the surroundings or to a flexible bellows (not shown). During this displacement, the flexible scraper 271 will to some extent close toward protrusions and grooves in the interior of the female part.

When the male part is pulled out from the female part at a later time, the spring 272 will push back the scraper (toward the left in FIG. 2). During this motion, the scraper 271 will again to some extent close toward protrusions and grooves in the interior of the female part, and push most of the inserted debris out of the female part. When the telescopic coupling again is maximally extended, the flexible scraper again forms a lid at the entrance to the female part.

FIG. 3a shows a drive shaft having a substantially conical head and a concave depression 161. When the drive shaft and head is rotated, the concave depression 161 will function as a spoon or spade such that sand and other material is loosened and transported axially backwards away from the coupling. The means for mechanically removing debris are intended to comprise any means and assemblies whereby mechanical means remove debris from the coupling.

FIG. 3b shows an alternative design of a similar conical head, having a screw 162 on its outer surface. The unwanted debris is here displaced backwards and away from the coupling by the screw 162.

Other conventional mechanical means for removing debris can also be adapted for this purpose. Such means may for example comprise screws having different designs from the one shown in FIG. 3b, or other devices functioning as a spade, a drill or a mill. Mechanical removal can be combined with flushing as described above.

The invention claimed is:
1. A coupling for wellbore applications between a first tool comprising a first drive shaft rotatably mounted in a first outer sleeve and a second tool comprising a second drive shaft rotatably mounted in a second outer sleeve, wherein:
   outer diameters of the first outer sleeve are less than or equal to corresponding inner diameters of the second outer sleeve, and one of the first outer sleeve and the second outer sleeve comprises at least one first latching dog fitting into at least one first groove of the other of the first outer sleeve and the second outer sleeve;

outer diameters of the first drive shaft are less than or equal to corresponding inner diameters of the second drive shaft, and one of the first drive shaft and the second drive shaft comprises at least one second latching dog fitting into at least one second groove in the other of the first drive shaft and the second drive shaft;

the coupling has an axially preloaded lid that is adapted to substantially close an entrance to the second outer sleeve when the coupling is not in use.

2. The coupling of claim 1, comprising at least one conduit through which displaced fluids may escape when connecting the first tool to the second tool.

3. The coupling of claim 1, comprising a chamber within the second drive shaft along an axial extension of the first driveshaft for accommodating residual debris.

4. The coupling of claim 1, comprising a latch on one of the first tool and the second tool and a corresponding radially extending shoulder on the other of the first tool and the second tool, wherein relative axial movement between the first tool and the second tool is prevented when the latch abuts the shoulder.

5. The coupling of claim 4, comprising inclined faces on the latch and a release sleeve that is axially movable over the inclined faces on the latch so that the latch is moved radially away from the shoulder when the release sleeve is moved towards a distal end of the latch.

6. The coupling of claim 1, wherein at least one of said first tool and said second tool comprises a mechanism for removing debris from the coupling, the mechanism comprising a head of the first drive shaft having the form of a concave depression or a screw so that debris is loosened and transported axially away from the coupling when the first drive shaft is rotated.

7. The coupling of claim 1, wherein the first tool comprises at least one inlet for well fluid and a pump, and a head of the first drive shaft comprises a conduit and one or more outlets, so that well fluid may be discharged to stir up debris in order to transport the debris away from the coupling.

8. The coupling of claim 1, wherein the lid comprises a flexible scraper adapted to scrape inner surfaces of the second driveshaft when the first drive shaft is inserted into or withdrawn from the second drive shaft.

9. The coupling of claim 8, wherein the flexible scraper is a brush with radially extending bristles.

10. The coupling of claim 1, wherein at least one said first tool and said second tool comprises a mechanical means for removing debris from the coupling.

11. The coupling of claim 1, wherein at least one of said first tool and said second tool comprises a flushing mechanism.

12. The coupling of claim 1, wherein at least one of said first tool and said second tool comprises a debris remover.

* * * * *